United States Patent
Klaassen et al.

(10) Patent No.: US 6,560,057 B1
(45) Date of Patent: May 6, 2003

(54) HEAD POSITIONING SYSTEM FOR A DISK DRIVE DURING A POWER DOWN CONDITION

(75) Inventors: Erno Hilbrand Klaassen, Santa Clara, CA (US); Bryan Scott Rowan, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,081

(22) Filed: Apr. 30, 1999

(51) Int. Cl.[7] .............................................. G11B 21/02
(52) U.S. Cl. ......................................................... 360/75
(58) Field of Search ............................... 318/803, 362, 318/375–377, 563, 284, 368; 360/75, 78.12

(56) References Cited

U.S. PATENT DOCUMENTS

| | | |
|---|---|---|
| 4,237,501 A | 12/1980 | Barmache et al. |
| 4,679,102 A | 7/1987 | Wevers et al. |
| 4,939,600 A | 7/1990 | Desai et al. |
| 5,128,568 A | 7/1992 | Carpenter |
| 5,384,524 A | 1/1995 | Romano |
| 5,486,957 A * | 1/1996 | Albrecht ....................... 360/75 |
| 5,495,156 A * | 2/1996 | Wilson et al. ............... 318/368 |
| 5,566,369 A | 10/1996 | Carobolante |
| 5,615,064 A * | 3/1997 | Blank et al. ................... 360/75 |
| 5,663,846 A | 9/1997 | Masouka et al. |
| 5,666,236 A * | 9/1997 | Bracken et al. ............... 360/75 |
| 5,936,788 A * | 8/1999 | Boutaghou et al. ........... 360/75 |
| 6,064,539 A * | 5/2000 | Null et al. ................ 360/73.03 |
| 6,140,784 A * | 10/2000 | Mazda ......................... 318/280 |
| 6,204,629 B1 * | 3/2001 | Rote et al. ................ 360/75 X |
| 6,282,049 B1 * | 8/2001 | Cameron et al. ............. 360/75 |

FOREIGN PATENT DOCUMENTS

| | | |
|---|---|---|
| JP | 01-292627 | 11/1989 |
| JP | 02-198059 | 8/1990 |

* cited by examiner

*Primary Examiner*—David Hudspeth
*Assistant Examiner*—K. Wong
(74) *Attorney, Agent, or Firm*—Ohlandt, Greeley, Ruggiero & Perle, L.L.P.; Randall Bluestone

(57) ABSTRACT

A disk drive includes a read/write head mounted on an actuator, a disk having an inner diameter region and an outer diameter region, the head being radially movable by the actuator between the inner diameter region and the outer diameter region. An unload ramp is positioned at the outer diameter region. A controller outputs control signals upon sensing a power down condition. A feedback circuit is adapted to sense a back emf generated by the actuator and to use the back emf to apply a counter-acting voltage to the actuator that tends to bring the actuator to a stop. A switch is responsive to the control signals to (i) connect the feedback circuit to the actuator to enable the actuator to be brought to a stop while the disk continues to rotate and (ii) for then causing the actuator to move the head to the unload ramp. The switch further applies a voltage which causes the actuator to bring the head to the inner diameter region of the disk, before causing the actuator to move the head to the unload ramp.

21 Claims, 3 Drawing Sheets

HEAD POSITIONING SYSTEM FOR A DISK DRIVE DURING A POWER DOWN CONDITION

FIELD OF THE INVENTION

This invention relates to a system and method for safely parking a read/write head of a disk drive in the event of a power down condition and more particularly, to such a method that enables the parking of the read/write head on a load/unload ramp, irrespective of the position of the read/write head upon the occurrence of the power-down condition.

BACKGROUND OF THE INVENTION

In the past, most disk drives have parked their read/write heads on the magnetic disks when the drives were powered off. This type of process is known as contact start-stop (CSS). In a CSS disk drive, just before the disk(s) stop spinning, and when they initially begin to spin, the heads are in contact with the disk. This generates wear at the interface between heads and disks, and limits the lifetime of the disk drive.

Note, that while the term "head" is used hereafter, the term "slider" can be substituted. A slider is a block of hard (usually ceramic) material that carries the actual read and write head elements. A slider allows the head to fly in close proximity to the disk through the action of an air bearing.

Alternatively, the heads can be removed from the disk during power-down by using a load/unload ramp at the outer diameter of the disks, as shown in FIG. 1. In FIG. 1, a disk drive 10 is shown, which contains one or more magnetic disks 12 that spin about a spindle 14. Data is written with onto disks 12 by a read/write head 16, and information is read back using the same read/write head 16. Read/write head 16 is attached to the bottom of a suspension 18 which is part of an actuator 20 that rotates about a pivot point 22. Actuator 20 is moved by current through a voice-coil motor 24. Crash stops (26 and 28) limit the travel of actuator 20. FIG. 1 shows a load/unload ramp 30 onto which a tab 32 at the tip of suspension 18 is pushed before disk(s) 12 stop spinning in order to remove read/write head(s) 16 from disk(s) 12. A flexible cable 29 connects actuator 20 to a connector 31.

A close-up view of load/unload ramp 30 is shown in FIGS. 2 and 3. While only a single disk and two heads are shown, multiple disks and multiple sets of heads are also possible. Disk 12 is mounted on spindle 22 and is rotated by a spindle motor 40. Read/write heads 16 are attached to suspensions 18 that contain tabs 32. Before disk 12 is stopped, tabs 32 are pushed onto load/unload ramp 30 which is attached to base plate 42 of disk drive 10 by a mounting screw 44 or other fastening means. He ads 16 are lifted off disk 12 by tab 32 on the end of suspension 18 that travels up load/unload ramp 30.

FIG. 3 is a top view of the arrangement shown from the side in FIG. 2 and illustrates the direction 46 which tab 32 moves when the tip of suspension 18 is pushed onto load/unload ramp 30 before disk 12 is stopped.

In the case of a system-initiated shutdown, with power still applied to the drive, the position and state (velocity) of the actuator can be found by reading servo information present on the disk. The actuator can then be stopped by the disk drive electronics, after which it can be moved onto the ramp in a controlled manner.

A more difficult case, and the one addressed by this invention, is one where the power to the disk drive is interrupted. This can happen as a result of a power failure, unplanned system outage, or physical removal of the drive from the system.

In prior art CSS disk drives, the actuator is usually pushed towards the inner diameter (ID) of the disk, into an ID crash stop (a compliant element that usually contacts the actuator at the end away from the heads to limit its travel). This action is accomplished by passing a current through the voice coil motor that controls the actuator, in the appropriate direction. This current is often generated by rectifying a back electromotive force (back-emf) from the spindle motor that spins the disks. Since the disks will still be spinning immediately after the power is cut due to their rotational inertia, the spindle motor acts as a generator and creates a back-emf across the spindle motor terminals. This back-emf is periodic in nature, and is therefore rectified to provide a control voltage.

The same method cannot safely be used in a load/unload disk drive, because high-speed impacts of the actuator with the ramp can cause permanent head, disk, ramp, or suspension damage. If the disk drive is in the middle of a seek when the power is cut, the heads can be traveling as fast as several meters per second, towards or away from the load/unload ramp.

In U.S. Pat. No. 4,237,501 to Barmache et al., a system is described for enabling an emergency head unload action in the event of a power down. A control circuit performs a dynamic braking action by electrically shorting a positioning coil to reduce the radial velocity of the head to zero. Then a current is applied which moves the head towards the disk's outer edge, followed by a further current to enable the head to climb an unload ramp. While the electrical shorting action of Barmache et al. will eventually achieve the velocity reduction, it is relatively slow acting. Further, there is no way of knowing where the head is actually positioned when its radial velocity drops to zero. Accordingly, it is difficult to assure that a correct current value is thereafter applied which will safely move the head to the unload ramp, without damage.

U.S. Pat. No. 4,679,102 to Wevers et al. describes a system for enabling an emergency head unload action in the event of a power down. The back-emf is used to control a stepper motor to move the head to a park position at the inner diameter of a disk. Since the position of the head may not be known, the timing of the pulses to the stepper motor is such that a sufficient number of pulses are applied to move the head to the parking zone, even if the head is present over the outer-most disk track. In a disk drive with a stepper motor instead of a voice coil motor, the actuator automatically stops when power to the drive is cut. The clocking method of Wevers et al. therefore cannot be applied to a disk drive with a voice coil motor.

Accordingly, it is an object of this invention to provide a method and apparatus for moving a transducer head to an unload position in the event of a power down action.

It is a further object of the invention to provide a method and apparatus for moving a transducer head to an unload position in the event of a power down action, wherein the head is moved in a controlled manner that avoids damage to the head-arm structure.

It is yet another object of the invention to provide fast acting method for moving a transducer head to an unload position in the event of a power down action.

SUMMARY OF THE INVENTION

A disk drive includes a read/write head mounted on an actuator, a disk having an inner diameter region and an outer diameter region, the head being radially movable by the actuator between the inner diameter region and the outer diameter region. An unload ramp is positioned at the outer diameter region. A controller outputs control signals upon sensing a power down condition. A feedback circuit is adapted to sense a back emf generated by the actuator and to use the back emf to apply a counter-acting voltage to the actuator that tends to bring the actuator to a stop. A switch is responsive to the control signals to (i) connect the feedback circuit to the actuator to enable the actuator to be brought to a stop while the disk continues to rotate and (ii) for then causing the actuator to move the head to the unload ramp. The switch further applies a voltage which causes the actuator to bring the head to the inner diameter region of the disk, before causing the actuator to move the head to said unload ramp.

DETAILED DESCRIPTION OF THE INVENTION

Figure 4:
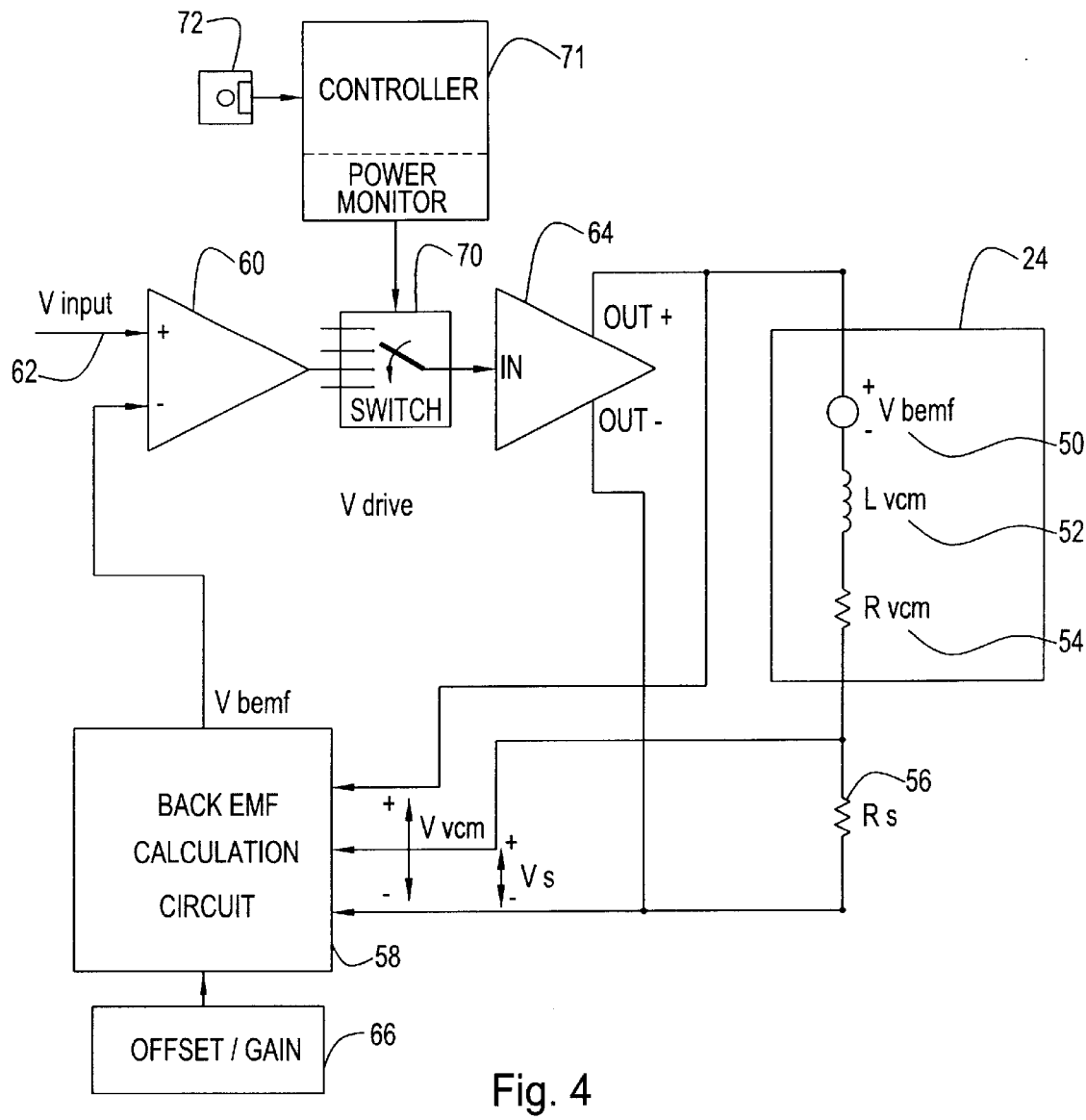
FIG. 4 is a circuit schematic showing how control voltages are developed to carry out the invention.

Referring to FIG. 4, an electrical equivalent of a voice coil motor 24 is shown and comprises a back emf voltage 50 in series with an inductance 52 in series with a resistance 54. A series resistance 56 is connected in series electrical connection with voice coil motor 24. A back-emf calculation circuit 58 computes the expression (Vvcm-Vs*(Rvcm/Rs)) (to be described below), and its output is connected to a feedback amplifier 60.

The other input to feedback amplifier 60 is an input voltage 62. The output of feedback amplifier 60 is connected (via a switching device 70 to be described with respect to FIG. 5) to the input of a power amplifier 64 whose outputs are connected to voice coil motor 24 and sense resistor 56. Switching device 70 is controlled by outputs from a controller 71 which, in turn, detects a power-down event and connects feedback amplifier 60 to voice coil motor 24 to enable the parking of head 16. A memory device 72 includes code for controlling the operation of controller 71 to perform the method of the invention. The memory device may include removable memory media such as a CD-ROM, CD-RW, a floppy disk, etc.

The feedback loop that is formed by the loop of amplifiers 60, 64, voice coil motor 24, sense resistor 56 and back emf calculation circuit 58 causes the output of back emf calculation circuit 58 to be driven equal to input voltage 62.

When a power failure is detected by the disk drive controller (not shown), the circuit of FIG. 4 is connected to voice coil motor 24 that actively drives the velocity of the actuator to zero, or to some small value towards the disk ID (i.E., away from load/unload ramp 30). The velocity of actuator 20 is measured by determining the back-emf of voice coil motor 24 (which is proportional to the angular velocity of actuator 20).

The electrical equivalent of voice coil motor 24 is a voltage source (back emf 50), in series with an inductor 52 (due to the electrical self-inductance of the coil windings), which is in turn in series with a resistance 54 (due to the resistance of the coil wiring). These are specified, respectively, as Vbemf, Lvcm, and Rvcm in FIG. 4. Sense resistor 56 (i.e., Rs), is connected to voice coil motor 24 as shown.

The voltage across sense resistor 56 is proportional to the current through voice coil motor 24. Since the voltage across resistance 54 (Rvcm) is the product of the current through voice coil motor 24 and the value of Rvcm (if inductance is neglected), the value of Vbemf can be calculated by the expression:

$$Vbemf=Vvcm-(Ivcm*Rvcm)=Vvcm-((Vs/Rs)*Rvcm)=Vvcm-Vs*(Rvcm/Rs) \quad (1)$$

In practice, however, it may not be accurate to neglect the value of Lvcm if the current through voice coil motor 24 changes rapidly. Accounting for the value of inductance 52, expression (1) becomes:

$$Vbemf=Vvcm-Vs*(Rvcm/Rs)-Lvcm*(dIvcm/dt) \quad (2)$$

Figure 1:
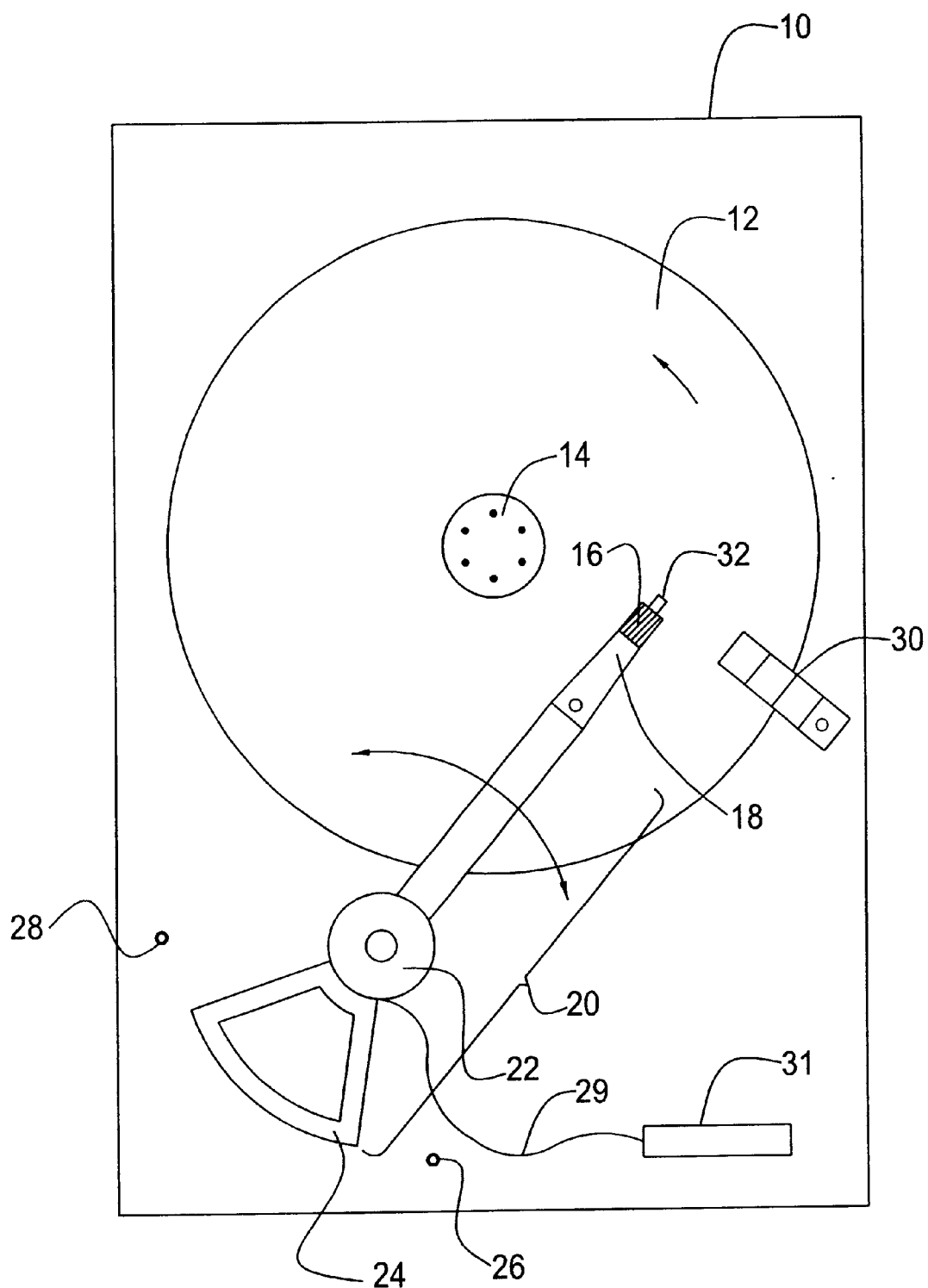
FIG. 1 is a top view of a prior art disk drive assembly.
Figure 2:
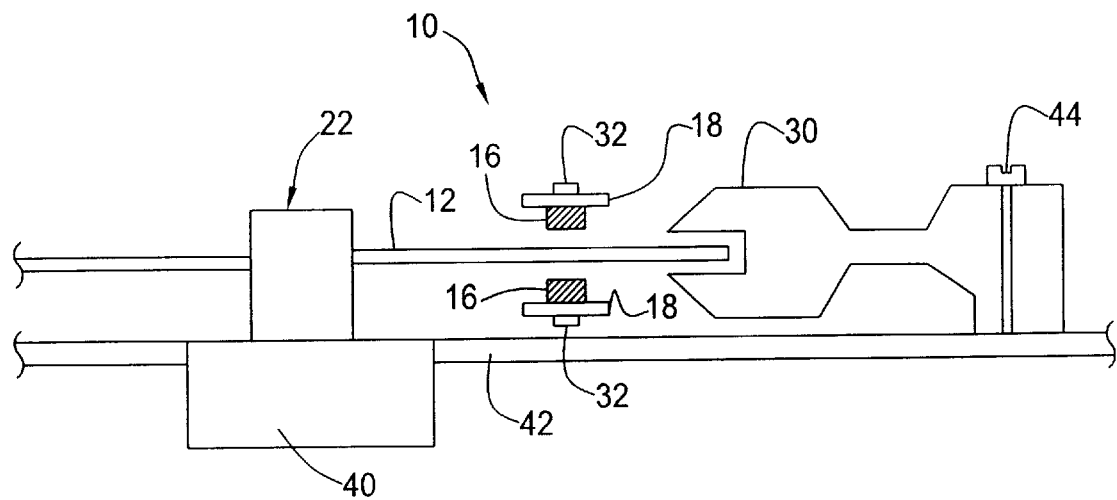
FIG. 2 is a side view of a portion of the disk drive assembly of FIG. 1.
Figure 3:
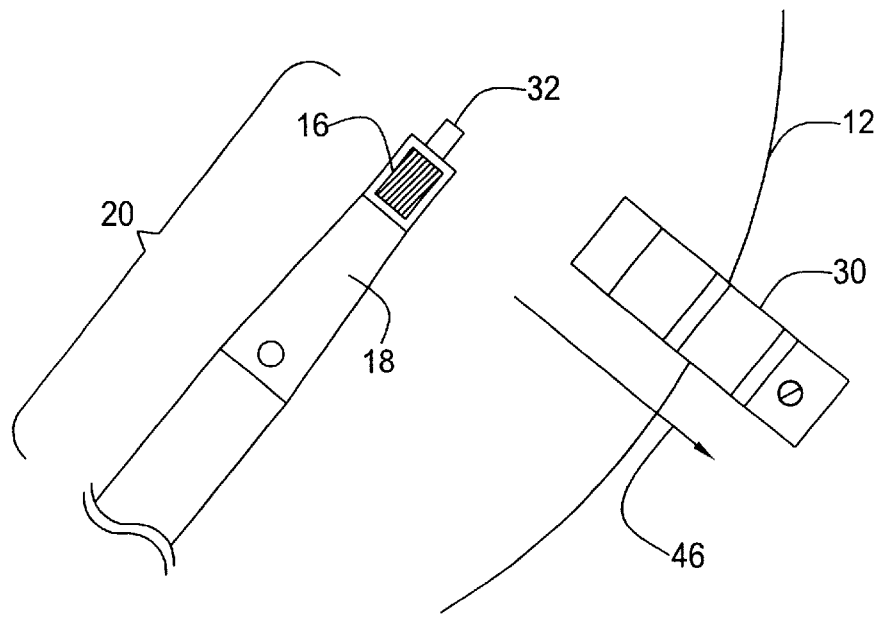
FIG. 3 is an expanded top view of the structure of FIG. 2.

Expression 2 shows that the back emf voltage can be found by subtracting the voltage across sense resistor 56, multiplied by a constant, from the voltage across voice coil motor 24 and, in addition, subtracting inductance 53, multiplied by the derivative of the current with respect to time. This expression is calculated by back-emf calculation circuit 58 in FIG. 3. This calculation can be performed using analog circuits including operational amplifiers, subtractors, adders, etc., or can be performed by an equivalent digital circuit.

Since the value of Rvcm changes with temperature, and is different for different disk drive units, the multiplier (Rvcm/Rs) used in the expression above will change. Likewise the value of Lvcm is different for different disk drives, as it depends on various factors, including wire diameter and the number of wire turns on voice coil motor 24. It can therefore be made programmable by use of an offset/gain circuit 66 as shown in FIG. 4. Since the voltage across sense resistor 56 is small, even a small input offset error will generate a relatively large error at the output which is corrected by offset/gain circuit 66.

The circuit shown in FIG. 4 drives the velocity of actuator 20 to zero (or a small value in the direction away from the ramp) by using a feedback loop that forces the back emf voltage to equal Vinput (which is chosen to equal zero a small value of the appropriate sign corresponding to actuator travel away from the ramp). The current is supplied from spindle motor 40, to power amp 64 and into voice coil motor 24.

Figure 5:
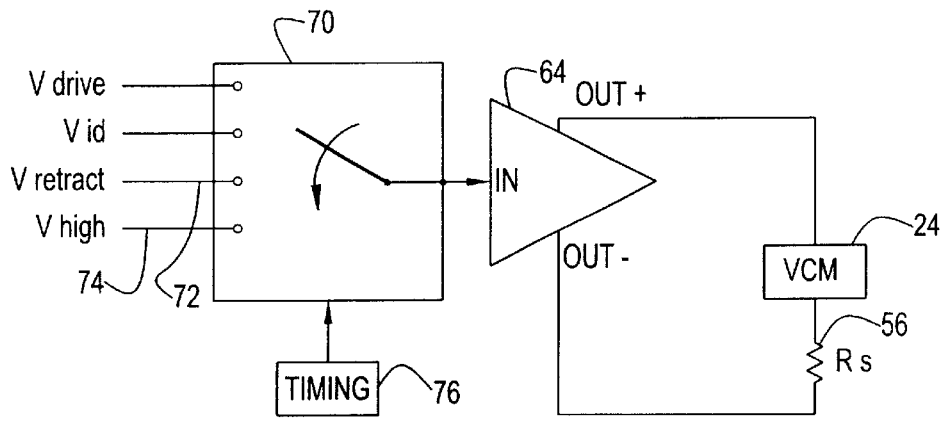
FIG. 5 is a circuit schematic showing how the control voltages are applied to the voice-coil motor that controls the head position.

FIG. 5 shows how driving voltage Vdrive in FIG. 4 is connected to power amp 64 through a switching device 70. Voice coil motor 24 and sense resistor 56 are driven by power amplifier 64. The input to power amplifier 64 is switched by switching device 70 between the output of feedback amplifier 60, a voltage to push head(s) 16 to the inner diameter of disk 12, a retract voltage 72 and a larger voltage 74 (Vhigh). The operation of switching device 70 is controlled by a timing unit 76 that forms part of a controlling processor or controller for the disk drive.

After a time delay (during which actuator 20 is actively brought to a halt) or a residual back emf voltage condition is sensed, actuator 20 is pushed to ID crash stop 26 with a small voltage (Vid) or current that is connected to power amplifier 64 via switching device 70. This action provides a known initial position for actuator 20.

After another time delay, a constant voltage 72 (Vretract) is applied via switching device 70 to voice coil motor 24 to retract actuator 20 and push it onto load/unload ramp 30. When a constant voltage is used, the maximum velocity of actuator 20 is limited, because once the back-emf in voice coil motor 24 builds up sufficiently high to equal the applied voltage, no more current flows through voice coil motor 24. Since the torque applied by voice coil motor 24 to actuator 20 is proportional to the current, no further acceleration of actuator 24 takes place, and this maximum velocity is maintained.

Alternatively, the system of FIG. 4 can be used to maintain a constant back emf during unloading of the heads onto ramp 30. External mechanical effects, such as torque from cable 29, may disturb the actuator velocity. Small current adjustments from the feedback system will correct for these perturbations and act to maintain a constant actuator velocity.

After a further time delay, a larger voltage 74, up to the maximum remaining voltage available from spindle motor 40 back emf (Vhigh), is applied by switching device 70 to voice coil motor 24 in order to ensure a successful unload. Under normal conditions, actuator 20 will already be on load/unload ramp 30 at this point, but this is done to ensure that spindle 14 does not stop with head 16 over disk 12, since this would cause head 16 to land on disk 12 and stick to the ultra-smooth disk surface, and the drive would fail.

Throughout the process described above, head(s) 16 are still flying above disk 12, since spindle 14 is still spinning. Head(s) 16 fly above disk 12 because of the action of an air bearing that forms underneath head(s) 16 when disk drags 12 air beneath them.

It should be understood that the foregoing description is only illustrative of the invention. Various alternatives and modifications can be devised by those skilled in the art without departing from the invention. For example, while FIG. 4 shows differential amplifier acting to provide a proportional control signal, it will be understood by those skilled in the art that amplifier 60 can be replaced by any combination of proportional, differential or integral control circuits that respond to the Vbemf value to output a control signal. Accordingly, the present invention is intended to embrace all such alternatives, modifications and variances which fall within the scope of the appended claims.

What is claimed is:

1. A disk drive including a read/write head mounted on an actuator, a disk having an inner diameter region and an outer diameter region, said read/write head radially movable by said actuator between said inner diameter region and said outer diameter region, a disk motor for rotating said disk and an unload ramp positioned at said outer diameter region, said disk drive further comprising:
   a control circuit for outputting control signals upon sensing a power down condition;
   a feedback circuit for sensing a back emf generated by said actuator and for using said back emf to apply a counter-acting first voltage to said actuator that tends to bring said actuator to a stop; and
   a switch device responsive to said control signals for (i) connecting said feedback circuit to said actuator to enable said actuator to be brought to said stop while said disk continues to rotate and (ii) for then causing said actuator to move said read/write head to said unload ramp.

2. The disk drive as recited in claim 1, wherein said switch device, during operation (ii), applies a second voltage which causes said actuator to bring said head to said inner diameter region of said disk, before causing said actuator to move said head to said unload ramp.

3. The disk drive as recited in claim 2, wherein said switch device, subsequent to causing said actuator to bring said head to said inner diameter region of said disk applies a third voltage to said actuator to cause said actuator to move said head to said unload ramp.

4. The disk drive as recited in claim 3, wherein said third voltage is a constant voltage.

5. The disk drive as recited in claim 3, wherein said switch device, subsequent to applying said third voltage to said actuator to cause said actuator to move said head to said unload ramp applies a fourth voltage to said actuator to assure engagement between said head and said unload ramp.

6. The disk drive as recited in claim 1, wherein said feedback circuit employs at least one of a: proportional, differential, integral and a combination thereof, feedback system to derive said counter-acting first voltage.

7. A disk drive including a read/write head mounted on an actuator, a disk having an inner diameter region and an outer diameter region, said read/write head radially movable by said actuator between said inner diameter region and said outer diameter region, a disk motor for rotating said disk and an unload ramp positioned at said outer diameter region, said disk drive further comprising:
   a control circuit for outputting control signals upon sensing a power down condition;
   a circuit for bringing said actuator to a stop; and
   a switch device responsive to said control signals for (i) connecting said circuit to said actuator to enable said actuator to be brought to a stop while said disk continues to rotate, (ii) applying a voltage which causes said actuator to bring said read/write head to said inner diameter region of said disk and (iii) for then causing said actuator to move said read/write head to said unload ramp from said inner diameter region.

8. The disk drive as recited in claim 7, wherein said circuit, subsequent to causing said actuator to bring said head to said inner diameter region of said disk applies a constant voltage to said actuator to cause said actuator to move said head to said unload ramp.

9. The disk drive as recited in claim 8, wherein said circuit means, subsequent to applying said constant voltage to said actuator to cause said actuator to move said head to said unload ramp applies a voltage that is larger than said constant voltage to said actuator to assure engagement between said head and said unload ramp.

10. A method for controlling a disk drive during a power down event, said disk drive including a read/write head mounted on an actuator, a disk having an inner diameter region and an outer diameter region, said head radially movable by said actuator between said inner diameter region and said outer diameter region, a disk motor for rotating said disk and an unload ramp positioned at said outer diameter region, said method responsive to a power down condition by performing the steps of:
   a) sensing a back emf generated by said actuator and using said back emf to apply a counter-acting first voltage to said actuator that tends to bring said actuator to a stop while said disk continues to rotate;
   b) applying a second voltage which causes said actuator to bring said head to said inner diameter region of said disk; and
   c) applying a third voltage to cause said actuator to move said head to said unload ramp.

11. The method as recited in claim 10, wherein said third voltage is a constant voltage.

12. The method as recited in claim 11, comprising the added step of:

d) applying a fourth voltage to said actuator to assure engagement between said head and said unload ramp.

13. A method for controlling a disk drive during a power down event, said disk drive including a read/write head mounted on an actuator, a disk having an inner diameter region and an outer diameter region, said head radially movable by said actuator between said inner diameter region and said outer diameter region, a disk motor for rotating said disk and an unload ramp positioned at said outer diameter region, said method responsive to a power down condition by performing the steps of:

a) bringing said actuator to a stop while said disk continues to rotate;
   b) applying a voltage to said actuator which causes said actuator to bring said head to said inner diameter region of said disk; and
   c) causing said actuator to move said head to said unload ramp from said inner diameter region.

14. The method as recited in claim 13, wherein, during step c) a constant voltage is applied to said actuator to cause said actuator to move said head to said unload ramp.

15. The method as recited in claim 14, comprising the added step of:

d) applying a larger voltage than said constant voltage to said actuator to assure engagement between said head and said unload ramp.

16. A memory media for enabling a control system to control a disk drive during a power down event, said disk drive including a read/write head mounted on an actuator, a disk having an inner diameter region and an outer diameter region, said head radially movable by said actuator between said inner diameter region and said outer diameter region, a disk motor for rotating said disk and an unload ramp positioned at said outer diameter region, said memory media comprising:

a) means for controlling said control system to sense a power down condition;
   b) means for controlling said control system to sense a back emf generated by said actuator and to use said back emf to apply a counter-acting first voltage to said actuator that tends to bring said actuator to a stop while said disk continues to rotate;
   c) means for controlling said control system to apply a second voltage which causes said actuator to bring said head to said inner diameter region of said disk; and
   d) means for controlling said control system to apply a third voltage to cause said actuator to move said head to said unload ramp.

17. The memory media as recited in claim 16, wherein said third voltage is a constant voltage.

18. The memory media as recited in claim 17, further comprising:

d) means for controlling said control system to apply a fourth voltage to said actuator, that is larger than said constant voltage to assure engagement between said head and said unload ramp.

19. A memory media for operating a control system to control a disk drive during a power down event, said disk drive including a read/write head mounted on an actuator, a disk having an inner diameter region and an outer diameter region, said head radially movable by said actuator between said inner diameter region and said outer diameter region, a disk motor for rotating said disk and an unload ramp positioned at said outer diameter region, said memory media comprising:

a) means for controlling said control system to sense a power down or reset condition by bringing said actuator to a stop while said disk continues to rotate;
   b) means for controlling said control system to apply a voltage to said actuator which causes said actuator to bring said head to said inner diameter region of said disk; and
   c) means for controlling said control system to cause said actuator to move said head to said unload ramp from said inner diameter region.

20. The memory media as recited in claim 19, wherein, means c) applies a constant voltage to said actuator to cause said actuator to move said head to said unload ramp.

21. The memory media as recited in claim 20, further comprising:

d) means for controlling said control system to apply a voltage to said actuator, that is larger than said constant voltage, to assure engagement between said head and said unload ramp.

* * * * *